Aug. 1, 1950     J. R. COLEY     2,516,958
METHOD OF PRODUCING KETONES
Filed May 23, 1946
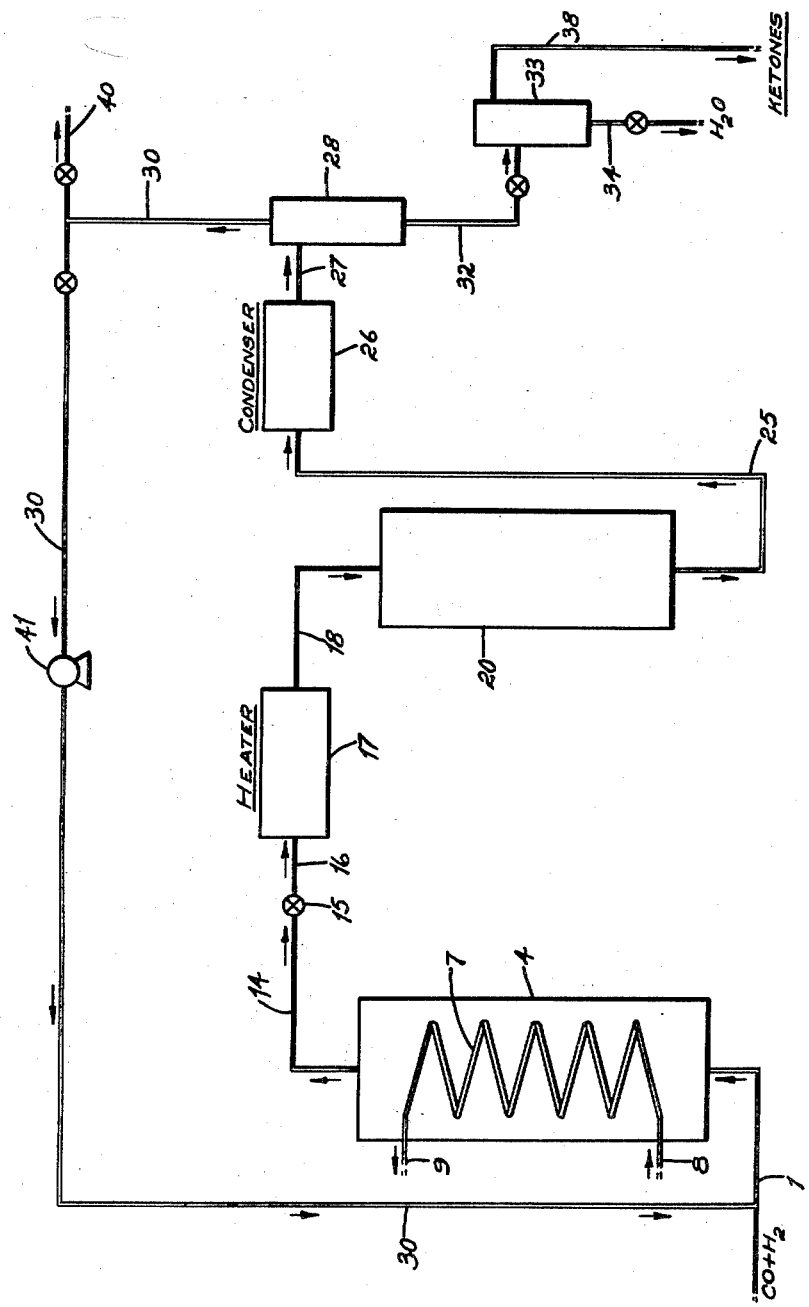
INVENTOR.
JOHN R. COLEY
BY Patented Aug. 1, 1950

2,516,958

UNITED STATES PATENT OFFICE 2,516,958

METHOD OF PRODUCING KETONES

John R. Coley, Chicago, Ill., assignor to The Texas Company, New York, N. Y., a corporation of Delaware Application May 23, 1946, Serial No. 671,685

7 Claims. (Cl. 260—595)

This invention relates to the hydrogenation of carbon monoxide to form products comprising mainly oxygenated hydrocarbons and to subsequent conversion of these oxygenated products into compounds of ketonic nature.

The invention contemplates the catalytic conversion of carbon monoxide and hydrogen under suitable conditions of temperature and pressure into products comprising primarily oxygenated hydrocarbons. After a temperature adjustment, the effluent from this conversion is passed, preferably immediately, into a separate conversion zone. The oxygenated hydrocarbons present in the effluent are substantially converted by contact with a dehydrogenation catalyst such as chromium oxide into compounds of ketonic nature in the separate conversion zone. The effluent from the conversion in which ketones are formed is separated into a normally liquid fraction and a normally gaseous fraction which latter contains a high hydrogen to carbon monoxide ratio. The normally gaseous fraction is recycled to the conversion zone wherein carbon monoxide is hydrogenated to form primarily oxygenated hydrocarbons.

The catalytic conversion of carbon monoxide and hydrogen can be directed towards the preparation of mainly oxygenated products by the use of selected operating conditions. The products formed in this type of conversion ordinarily comprise, on a water-free basis, about 60 to 70 per cent aliphatic alcohols, 10 to 20 per cent olefins, 10 to 20 per cent paraffins and about 5 per cent acids. The aldehyde and ketone portion is usually less than 1 per cent of the total products.

This invention provides a method for converting substantially all of the oxygenated products formed in this type of a conversion into ketones which may be used as solvents and in the manufacture of plasticizers and perfumes. The ordinary methods of producing high molecular weight ketones are laborious and expensive, as contrasted with the methods of this invention whereby large quantities of ketones may be formed by a simple procedure.

Carbon monoxide and hydrogen are converted into primarily oxygenated products by employing temperatures which are below the temperatures normally identified with a particular catalyst. Elevated pressures in the range of 270 to 450 pounds per square inch are preferred with optimum results generally being obtained at about 375 pounds per square inch. When an unsupported fused iron catalyst containing about 95 to 97 per cent iron, two to three per cent alumina and about one per cent alkali metal oxide such as potassium oxide is used for the conversion of carbon monoxide into products comprising mainly alcohols, excellent results are obtained at operating conditions which comprise temperatures in the range of about 350° to 395° F. and pressures of about 350 to 375 pounds per square inch. The ratio of hydrogen to carbon monoxide in the reactor feed may vary from about 1:1 to about 3:1.

The total effluent from such a conversion, including water vapor, at a temperature of about 395° F., is passed into a heater wherein it is raised to a temperature in the range of 660° to 830° F. At this temperature, the total product of the hydrogenation of carbon monoxide is passed into a conversion zone wherein it contacts a chromium oxide catalyst. By contact with a chromium catalyst at this temperature, the alcohols and acids present in the effluent from the hydrogenation of carbon monoxide are substantially converted into aliphatic ketones of varying molecular weights. Some dehydroaromatization of the aliphatic hydrocarbons present in the product also takes place during this chromium oxide treatment.

Treatment with chromium oxide catalyst at 660° F. to 830° F. and preferably at about 795° F. converts a substantial portion of the alcohols and acids present in the effluent into ketones. The following equations illustrate the overall reactions by which alcohols and acids are converted in the presence of the catalyst into ketones, but do not indicate the mechanism of the conversions: the first equation represents the overall reaction for the conversion of alcohols to ketones; the second equation represents the overall reaction for the conversion of acids to ketones. R is either hydrogen or an alkyl group; if it is an alkyl group, it may be saturated or unsaturated and may contain from 1 to 20 carbon atoms.

$$RCH_2CH_2OH + RCH_2CH_2OH \rightarrow RCH_2COCH_2R + CO + 3H_2$$

$$RCH_2COOH + RCH_2COOH \rightarrow RCH_2COCH_2R + CO_2 + H_2O$$

The effluent from the ketone formation step is cooled so as to condense the normally liquid constituents which include a large percentage of water which was formed in the hydrogenation of carbon monoxide. The uncondensed normally gaseous constituents of the effluent from the chromium oxide treatment are recycled to the hydrogenation of carbon monoxide.

Since alcohols constitute 60 to 70 per cent of the total products of the hydrogenation of carbon monoxide, it may be seen from the above equations that the normally gaseous constituents from the chromium oxide treatment will contain a high molecular ratio of hydrogen to carbon monoxide. As may be seen from the above equations, alcohols are converted into ketones by the chromium oxide treatment with the attendant formation of hydrogen and carbon monoxide at an approximate ratio of 3:1. The normally gaseous fraction which is recycled to the hydrogenation of carbon monoxide also contains a considerable concentration of carbon dioxide since the acids formed in the hydrogenation of carbon monoxide are converted into ketones with the attendant formation of carbon dioxide.

I find that the normally gaseous constituents of the effluent from the chromium oxide treatment provides an excellent recycle gas for the hydrogenation of carbon monoxide. It appears that a recycle gas stream containing a high hydrogen to carbon monoxide ratio and a substantial percentage of carbon dioxide minimizes carbon dioxide formation during the hydrogenation of carbon monoxide. It seems that the concurrence of these two factors, namely high hydrogen to carbon monoxide ratio and substantial percentages of carbon dioxide in the recycle stream practically eliminates the net production of carbon dioxide during the hydrogenation of carbon monoxide. Minimizing carbon dioxide formation in this manner during conversion makes available more carbon for conversion into valuable products.

The removal of water from the recycle gas stream by condensation as outlined above is also advantageous for the presence of a large concentration of water vapor in the recycle stream serves to promote the formation of carbon dioxide during the hydrogenation of carbon monoxide to form a product consisting mainly of oxygenated products.

The advantages of conducting the conversion of carbon monoxide and hydrogen into mainly oxygenated products in conjunction with a chromium oxide treatment of the effluent therefrom are numerous and are summarized in the following paragraph.

First, an economical method of preparing valuable ketonic compounds is made available. Secondly, the chromium oxide treatment produces a gaseous fraction which contains a high ratio of hydrogen to carbon monoxide which serves excellently as a recycle gas for the hydrogenation of carbon monoxide. Thirdly, carbon dioxide produced by the conversion of acids to ketones by the chromium oxide treatment suppresses carbon dioxide formation in the hydrogenation of carbon monoxide to which it is returned as a component of recycle gas. Fourthly, advantage is taken of the sensible heat of the products of hydrogenation of carbon monoxide for they are immediately subjected to treatment with chromium oxide. Fifthly, condensation of liquid ketones and other liquid products of the chromium oxide treatment removes water from the gas which is recycled to hydrogenation of carbon monoxide.

In order that the invention may be more aptly described and fully understood, reference will now be made to the attached drawing in which a preferred modification of the invention is illustrated.

A synthesis gas mixture of carbon monoxide and hydrogen is obtained from a source not shown through a pipe 1. Any convenient method of preparation, such as the oxidation of methane or the water gas reaction, may be used to supply synthesis gas. The molecular ratio of carbon monoxide to hydrogen should lie in the range of about 1:1 to 1:3.

The synthesis gas mixture is at a pressure of about 270 to 450 lbs. per square inch. Since elevated pressures are employed for the catalytic conversion of carbon monoxide into products comprising mainly oxygenated products, it is advantageous to prepare synthesis gas at superatmospheric pressures also.

The mixture of synthesis gas is introduced into a reactor 4 through the pipe 1. The reactor 4 may be adapted to any of the various methods of catalytic conversion which have come into wide use in the petroleum field. For example, a fluidized bed type of catalytic conversion may be employed wherein catalyst is maintained in a fluidized state without substantial entrainment of catalyst particles from the gas stream leaving the reactor. Fixed bed conversion, moving catalyst bed conversion in which gaseous reactants and catalyst flow counter-currently and suspensoid type of conversion in which catalyst and reactants flow concurrently, are other types of catalytic systems which may be employed in the reactor 4.

An unsupported iron catalyst containing about 94 to 97 per cent metallic iron, 2 to 5 per cent alumina and 0.2 to 2 per cent alkali metal oxide calculated as potassium oxide is an excellent catalyst for the conversion of carbon monoxide and hydrogen into primarily oxygenated products. Other catalysts may be used to effect this conversion such as a catalyst containing cobalt or nickel as the hydrogenating metal.

If a fluid technique is employed, particle size distribution of this catalyst should be such as to promote fluidization. The particle size of the catalyst should vary from about 40 to 200 mesh; expressed in another way, the particle diameters should range from about 5 to 400 microns.

The reactor is maintained at a temperature within the range of about 350° to 410° F. A cooling element, which is represented in the drawing by a coil 7, is used to dissipate the heat generated by the catalytic conversion. A heat exchange medium such as diphenyl or water enters the coil 7 through a pipe 8 and issues therefrom through a pipe 9. This indirect heat exchange may be used to generate steam, thereby providing a source of energy. The coil 7 is only illustrative of one of the many types of heat exchange elements which may be employed to effect indirect heat exchange; bayonet-type tubes provide an efficient type of heat exchange element.

Carbon monoxide and hydrogen are converted into mainly oxygenated compounds by contact with catalyst in the reactor 4. In the drawing, only one reactor for the conversion of synthesis gas into a product comprising mainly oxygenated compounds is illustrated. However, it is contemplated that two or more similar type reactors may be connected in series with a portion of the conversion taking place in each stage. Whether one or a series of converters is employed, 95 per cent or better over-all conversion of carbon monoxide is effected.

The products of conversion, together with minor quantities of unreacted carbon monoxide and hydrogen, leave the reactor 4 through a pipe 14. This effluent, which comprises a major portion of oxygenated products, is at a temperature of about 350 to 410° F.

The pipe 14 leads into a pressure reducing valve 15 in which the effluent may be reduced to a pressure substantially lower than that existing in the reactor 4. The conversion of oxygenated compounds into ketones is favored by lower pressures and correspondingly it is advantageous to conduct the treatment with chromium oxide at reduced pressures. The total effluent, advantageously at a pressure substantially lower than that existing in the reactor 4, leaves the pressure reducing valve 15 through a pipe 16 and is introduced into a heater 17 in which the total product is heated to a temperature in the range of 660° to 830° F. and preferably to a temperature of about 790° F. The total effluent leaves the heater 17 through a pipe 18 and is immediately thereafter introduced into a conversion zone 20 wherein it contacts a chromium oxide catalyst.

A chromium oxide catalyst prepared by the following procedure gives excellent conversion of the oxygenated constituents of the effluent into compounds of ketonic nature. Chromium hydroxide is precipitated from a cold one normal solution of chromium nitrate by one normal sodium hydroxide. The precipitated chromium hydroxide is re-dissolved in excess sodium hydroxide. The solution of chromite so formed gives a fine precipitated chromium hydroxide gel on standing overnight. The chromium hydroxide gel is washed anion free, dried at 430° F., screened to 8 to 10 mesh and is then heated up to about 900° F. Chromium oxide produced in this fashion proves to be an excellent catalyst but other methods of chromium oxide preparation which are well-known may also be employed.

The products of the conversion of carbon monoxide and hydrogen contact a chromium oxide catalyst of the type described at about 790° F. with resulting conversion of a substantial portion of the oxygenated products into ketones. Alcohols, which constitute about 60 to 70 per cent of the total products of the hydrogenation of carbon monoxide produce ketones by dehydrogenation and condensation of two molecules of alcohol; at the same time hydrogen and carbon monoxide in the ratio of about 3:1 are formed by the conversion of alcohols into ketones. Acids present in the product undergo a bi-molecular condensation to produce ketones with simultaneous formation of carbon dioxide and water.

At the same time there occurs cyclization and dehydrogenation of a portion of the alcohols to form compounds of phenol nature. Higher temperatures favor the formation of phenols. Phenol formation may be represented by the following equation:

During the treatment of the products of the hydrogenation of carbon monoxide with chromium oxide, a layer of carbon deposits upon the surface of the chromium oxide catalyst. This carbon layer may be removed and the catalyst regenerated by conventional treatment with air or oxygen at an elevated temperature. After complete removal of the carbon layer, which may be evidenced by the absence of oxides of carbon in the effluent from the regeneration treatment, the conversion zone 20 may be flushed with nitrogen and then the catalyst treated with hydrogen until the evolution of water ceases.

Since periodic regeneration of the catalyst is necessary, it is advisable to have two or more converters for the chromium oxide treatment of the products of the hydrogenation of carbon monoxide so that one or more may be on stream while the catalyst in another is being regenerated by the outlined procedure.

The product formed by chromium oxide treatment leaves the conversion zone 20 through a pipe 25 and is introduced into a condenser 26 in which normally liquid hydrocarbons, normally liquid hydrocarbon derivatives such as ketones, and water are condensed. The total product then passes along a pipe 27 into a gas-liquid separator 28 in which division of the products into normally liquid and normally gaseous components is effected. The gaseous components comprising hydrogen, carbon monoxide, carbon dioxide, normally gaseous hydrocarbons such as propane, butane and a small portion of low boiling oxygenated derivatives leaves the separator 28 through a pipe 30. Further treatment of this gas stream will be described in detail later.

The liquid components of the effluent from the chromium oxide treatment leave the separator 28 through a pipe 32 and are introduced into a separator 33. In the separator 33, water is separated from liquid hydrocarbons, ketones and other oxygenated products. The water extract is withdrawn from the separator 33 through a pipe 34. This water extract contains dissolved therein a portion of the lower boiling ketones such as acetone and a portion of low boiling alcohols and acids which have not been converted into ketones through the chromium oxide treatment.

The lower boiling ketones, alcohols, acids and aldehydes may be separated from this water extract by conventional procedures. For example, oxygenated products may be removed from the water by distillation.

There is withdrawn from the separator 33 through a pipe 38 a liquid fraction which comprises ketones and phenols, both of which have been prepared by the chromium oxide treatment of the oxygenated products of the hydrogenation of carbon monoxide, liquid hydrocarbons of olefinic and paraffinic nature and oxygenated derivatives such as alcohols which have undergone the chromium oxide treatment without change. The division of this mixture into its individual components may be accomplished by conventional means. For example, phenols and acids present therein may be removed by washing with aqueous alkaline solution. Ketones and alcohols may be separated from liquid hydrocarbons by solvent extraction and then separated into individual components by close fractionation.

The gaseous fraction which leaves the separator 28 through the pipe 30 is recycled to the hydrogenation of carbon monoxide. The total gas stream proceeds along the pipe 30 which leads into the pipe 1 through which the fresh feed of carbon monoxide and hydrogen is introduced into the reactor 4. A vent 40 is inserted in the line 30 whereby a portion of the gas is discharged in order to prevent nitrogen accumulation in the system.

A compressor 41 is inserted in the pipe 30 to raise the recycle gas to the desired pressure, e. g., about 270 to 450 lbs. per square inch.

As indicated previously, this gas stream contains a high molecular ratio of hydrogen to carbon monoxide and a substantial percentage of carbon dioxide which have proven to be advantageous in minimizing the formation of carbon dioxide during the catalytic conversion of carbon monoxide and hydrogen into oxygenated products. Hydrogen and carbon monoxide are present in the recycle stream in the approximate ratio of 3:1, the carbon dioxide concentration of the recycle stream is about 15 to 35 mol per cent. The suppression of carbon dioxide formation by recycling a gas stream of this character leaves more carbon monoxide for conversion into valuable products.

By way of example, fresh synthesis gas containing carbon monoxide and hydrogen in the molecular ratio of 1:1.5 is obtained through the pipe 1. There is combined therewith recycle gas comprising the normally gaseous constituents of the effluent from the chromium oxide treatment so that the total feed to the reactor comprises fresh synthesis gas and recycle gas in the ratio of about 1:1. Reactor feed comprising synthesis gas and recycle gas is introduced into the reactor 4 at a space velocity of about 1,000—space velocity being defined as the volume of gas at standard conditions per volume of catalyst per hour.

In the reactor 4, an iron catalyst of the composition previously described is maintained in a fluid state without substantial entrainment of catalyst particles in the effluent leaving the reactor; the catalyst is maintained in a state simulating boiling by correlating the velocity of the reactor feed with the density and particle size of the catalyst. Conversion within the reactor 4 takes place at a temperature of about 370° to 415° F. and at a pressure of about 375 pounds per square inch. The effluent from the reactor 4 is introduced directly into the heater 17 after it has been reduced to about 25 to 50 pounds per square inch in the expansion valve 15. This effluent contains the products of conversion of carbon monoxide and hydrogen; 150 grams of liquid product consisting of hydrocarbons and hydrocarbon derivatives per cubic meter of fresh synthesis gas can be separated from this effluent by condensation.

In the heater 17, the effluent is raised to a temperature of about 790° F. and is thereafter immediately passed to the reactor 20 wherein the effluent contacts the chromium oxide catalyst of the type previously described. Ketones are formed from alcohols and acids present in the effluent from the reactor 4 by the chromium oxide treatment in the reactor 20. An effluent comprising the products of the chromium oxide treatment leaves the reactor 20 through a pipe 25 and is cooled so as to effect condensation of the liquid components.

A liquid product is obtained comprising ketones, alcohols, phenols and hydrocarbons. From the liquid product may be separated ketones in a yield amounting to about 70 grams per cubic meter of fresh synthesis gas introduced into the reactor 4. The liquid product contains alcohols which are primarily $C_2$ to $C_{20}$ alcohols; a yield of about 15 grams of alcohols per cubic meter of fresh synthesis gas is obtained. Liquid hydrocarbons to the extent of about 55 grams per cubic meter of fresh synthesis gas are also separated from the liquid product. Compounds of phenolic nature to the extent of about 2 grams per cubic meter of fresh synthesis gas may also be separated from the liquid product.

The normally gaseous portion of the effluent from the reactor 20 is recycled through the pipe 30 to the pipe 1 where it serves to make up the reactor feed. From time to time, a portion of these normally gaseous constituents are vented through a vent 40 to prevent an accumulation of nitrogen in the system.

Furthermore, the recycle stream is substantially free of water vapor because of the liquefaction of the normally liquid products of the chromium oxide treatment.

It is contemplated that provision may be made so that only a portion of the products produced in the hydrogenation of carbon monoxide be converted to ketones by treatment with chromium oxide, as outlined in the previous description. In such instance, the effluent from the converter 4 is separated into two streams, one of which may be treated with a chromium oxide catalyst as outlined above, while the other undergoes conventional treatment to cover the alcohols or other oxygenated products therefrom.

In the description of the invention, it has been stated that hydrogenation of carbon monoxide may be conducted in various types of catalytic converters such as a fluid bed reactor, a fixed bed converter, etc. The same situation exists as far as the chromium oxide treatment is concerned. The chromium oxide treatment may also be effected in various types of reactors such as a fluid bed type, a fixed bed converter, a moving bed system, etc.

While chromium oxide has been specifically mentioned as a dehydrogenating catalyst, it is contemplated that other catalysts may be used, such as the oxides of molybdenum, tungsten and vanadium.

Obviously many modifications and variations of the invention, as hereinbefore set forth, may be made without departing from the spirit and scope thereof and, therefore, only such limitations should be imposed as are indicated in the appended claims.

I claim:

1. A continuous process for producing aliphatic ketones from carbon monoxide and hydrogen which comprises continuously passing carbon monoxide and hydrogen to a synthesis zone containing a synthesis catalyst maintained in a fluidized state and at a temperature in the range of about 300° to 410° F. and at a pressure of about 270 to 450 pounds per square inch, effecting substantial conversion of carbon monoxide and hydrogen into a product mixture of oxygenated compounds comprising 60 to 70 per cent aliphatic primary alcohols and about 5 per cent aliphatic acids, continuously discharging said product mixture from said synthesis zone, passing said product mixture to a dehydrogenation zone containing a chromic oxide catalyst maintained in a fluidized state and at a temperature in the range of about 660° to 830° F., and at a pressure of about atmospheric to 350 pounds per square inch, effecting substantial conversion of said primary alcohols and acids into ketones, said conversion being accompanied by the formation of gaseous products comprising hydrogen, carbon monoxide and carbon dioxide, continuously discharging resulting products of reaction from said dehydrogenation zone, separating said discharged products into a normally liquid fraction and a normally gaseous fraction containing carbon dioxide, hydrogen and carbon monoxide, the ratio of hydrogen to carbon monoxide being approximately 3 to 1 in said gaseous fraction, isolating ketones from said liquid product and recycling said gaseous fraction to said synthesis zone.

2. The method according to claim 1 in which the synthesis catalyst is an unsupported iron catalyst containing about 95 to 97 per cent iron, 2 to 3 per cent alumina and about 1 per cent alkali metal oxide.

3. A process for producing aliphatic ketones from carbon monoxide and hydrogen which comprises passing carbon monoxide and hydrogen to a synthesis zone containing a synthesis catalyst maintained at an elevated temperature above about 300° F. and at a pressure above 270 pounds per square inch gauge, effecting substantial conversion of carbon monoxide and hydrogen into a mixture of oxygenated compounds comprising mainly aliphatic primary alcohols and about 5 per cent aliphatic acids, passing said mixture to a conversion zone containing a dehydrogenation catalyst maintained at an elevated temperature in the range of about 660–830° F. and under a pressure in the range of about atmospheric to 350 pounds per square inch gauge, effecting substantial conversion of oxygenated compounds into ketones, said conversion being accompanied by the formation of gaseous products comprising hydrogen, carbon monoxide and carbon dioxide, said gas containing a high ratio of $H_2$ to CO, removing resulting products from said dehydrogenation zone and recycling at least a portion of said gas to said synthesis zone.

4. A process for producing aliphatic ketones from carbon monoxide and hydrogen which comprises passing carbon monoxide and hydrogen to a synthesis zone containing a synthesis catalyst maintained at an elevated temperature in the range of about 300–410° F. and at a pressure in the range of about 270–450 pounds per square inch gauge, effecting substantial conversion of carbon monoxide and hydrogen into a mixture of oxygenated compounds comprising mainly aliphatic primary alcohols and about 5 per cent aliphatic acids, passing said mixture to a conversion zone containing a dehydrogenation catalyst maintained at an elevated temperature in the range of about 660–830° F. and under a pressure in the range of about atmospheric to 350 pounds per square inch gauge, effecting substantial conversion of oxygenated compounds into ketones, said conversion being accompanied by the formation of gaseous products comprising hydrogen, carbon monoxide and carbon dioxide, said gas containing a high ratio of $H_2$ to CO, removing resulting products from said dehydrogenation zone and recycling at least a portion of said gas to said synthesis zone.

5. A continuous process for producing aliphatic ketones from carbon monoxide and hydrogen which comprises continuously passing carbon monoxide and hydrogen to a synthesis zone containing a synthesis catalyst maintained at a temperature in the range of about 300–410° F. and at a pressure in the range of about 270 to 450 pounds per square inch, effecting substantial conversion of carbon monoxide and hydrogen into a product mixture of oxygenated compounds comprising mainly aliphatic primary alcohols and about 5 per cent aliphatic acids, continuously discharging said product mixture from said synthesis zone, passing said product mixture to a dehydrogenation zone containing a chromia catalyst and maintained at a temperature in the range of about 660 to 830° F. and at a pressure between about atmospheric and 350 pounds per square inch, effecting substantial conversion of said oxygenated compounds into ketones, said conversion being accompanied by the formation of gaseous products comprising hydrogen, carbon monoxide and carbon dioxide, said gas containing a high ratio of $H_2$ to CO, continuously discharging resulting products of reaction from said dehydrogenation zone, separating gaseous constituents from said discharged products and recycling separated gas to said synthesis zone.

6. A continuous process for producing aliphatic ketones from carbon monoxide and hydrogen which comprises continuously passing carbon monoxide and hydrogen to a synthesis zone containing a synthesis catalyst maintained in a fluidized state at a temperature in the range of about 300° to 410° F. and at a pressure of 270 to 450 pounds per square inch, effecting substantial conversion of carbon monoxide and hydrogen into a product mixture of oxygenated compounds comprising mainly aliphatic primary alcohols and about 5 per cent aliphatic acids, continuously discharging said product mixture from said synthesis zone passing said product mixture to a dehydrogenation zone containing a chromic oxide catalyst maintained at a temperature in the range of about 660° to 830° F., and at a pressure of about atmospheric to 350 pounds per square inch, effecting substantial conversion of oxygenated compounds into ketones, said conversion being accompanied by the formation of gaseous products comprising hydrogen, carbon monoxide and carbon dioxide, continuously discharging resulting products of reaction from said dehydrogenation zone, separating said discharged products into a normally liquid fraction and a normally gaseous fraction containing carbon dioxide, hydrogen and carbon monoxide, the proportion of hydrogen being relatively large with respect to the carbon monoxide, and recycling said gaseous fraction to said synthesis zone.

7. A process according to claim 5 in which the synthesis catalyst is an unsupported iron catalyst containing about 95 to 97 per cent iron, 2 to 3 per cent alumina and about 1 per cent alkali metal oxide.

JOHN R. COLEY.

REFERENCES CITED

The following references are of record in the file of this patent:

UNITED STATES PATENTS

| Number | Name | Date |
|---|---|---|
| 1,704,751 | Luther et al. | Mar. 12, 1929 |
| 1,978,404 | Bloomfield | Oct. 30, 1934 |
| 1,999,196 | Lazier | Apr. 30, 1935 |
| 2,002,534 | Frolich | May 28, 1935 |
| 2,365,094 | Michael et al. | Dec. 12, 1944 |

Certificate of Correction

Patent No. 2,516,958                                          August 1, 1950

JOHN R. COLEY

It is hereby certified that error appears in the printed specification of the above numbered patent requiring correction as follows:

Column 2, line 17, after the word "chromium" insert *oxide*; column 3, line 26, for "percentages" read *percentage*;

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*